US012789329B2

(12) United States Patent
Bothmann

(10) Patent No.: US 12,789,329 B2
(45) Date of Patent: Nov. 10, 2026

(54) IMPACT WRENCH

(71) Applicant: Snap-on Incorporated, Kenosha, WI (US)

(72) Inventor: Rich Bothmann, Round Lake, IL (US)

(73) Assignee: Snap-on Incorporated, Kenosha, WI (US)

( * ) Notice: Subject to any disclaimer, the term of this patent is extended or adjusted under 35 U.S.C. 154(b) by 494 days.

(21) Appl. No.: 18/127,456

(22) Filed: Mar. 28, 2023

(65) Prior Publication Data

US 2024/0326203 A1 Oct. 3, 2024

(51) Int. Cl.
*B25B 21/02* (2006.01)
*B25B 21/00* (2006.01)
*B25F 5/00* (2006.01)

(52) U.S. Cl.
CPC ............ *B25B 21/02* (2013.01); *B25B 21/002* (2013.01); *B25F 5/001* (2013.01)

(58) Field of Classification Search
CPC ........ B25B 21/02; B25B 21/002; B25F 5/001
See application file for complete search history.

(56) References Cited

U.S. PATENT DOCUMENTS

| | | | | |
|---|---|---|---|---|
| 3,053,360 | A | 9/1962 | Madsen | |
| 4,316,512 | A | 2/1982 | Kibblewhite et al. | |
| 5,624,000 | A * | 4/1997 | Miller | B25F 5/001 173/217 |
| 6,499,381 | B2 | 12/2002 | Ladish et al. | |
| 6,733,414 | B2 | 5/2004 | Elger | |
| 7,124,839 | B2 | 10/2006 | Furuta | |
| 7,168,503 | B1 | 1/2007 | Teng | |
| 8,074,731 | B2 | 12/2011 | Iwata et al. | |
| 8,172,713 | B2 | 5/2012 | Nakamura | |
| 8,253,285 | B2 | 8/2012 | Yoshida et al. | |
| 8,286,723 | B2 | 10/2012 | Puzio et al. | |
| 8,403,072 | B2 | 3/2013 | Eshleman et al. | |
| 8,418,778 | B2 | 4/2013 | Eshleman et al. | |
| 8,490,714 | B2 | 7/2013 | Nakamura | |
| 8,555,999 | B2 | 10/2013 | McRoberts et al. | |
| 8,584,770 | B2 | 11/2013 | Zhang et al. | |

(Continued)

FOREIGN PATENT DOCUMENTS

| | | |
|---|---|---|
| CN | 205343015 U | 6/2016 |
| CN | 110601391 A | 12/2019 |

(Continued)

OTHER PUBLICATIONS

UK Intellectual Property Office, Search and Examination Report issued in corresponding Application No. GB2403176.7, dated Sep. 4, 2024, 8 pp.

(Continued)

*Primary Examiner* — Michelle Lopez
(74) *Attorney, Agent, or Firm* — Taft, Stettinius & Hollister LLP

(57) ABSTRACT

A pistol-grip type tool, such as an impact wrench, that is smaller than traditional impact wrenches, to allow for use in tight work areas. To minimize size and length, the tool includes a tool housing, a frameless motor, a rear motor bearing supported in a bearing pocket in the tool housing, and a nose housing coupled to the tool housing that supports and aligns a ring gear, bearing assembly, and impact mechanism with an axis of the motor.

23 Claims, 11 Drawing Sheets

(56) References Cited

U.S. PATENT DOCUMENTS

| | | | | |
|---|---|---|---|---|
| 8,631,880 | B2 | 1/2014 | Murthy et al. | |
| 8,714,279 | B2 * | 5/2014 | Nagasaka | B25B 21/02 173/104 |
| 8,757,286 | B2 | 6/2014 | Nagasaka et al. | |
| 8,760,102 | B2 | 6/2014 | Hirabayashi et al. | |
| 8,800,679 | B2 | 8/2014 | Eshleman et al. | |
| 8,800,680 | B2 | 8/2014 | Eshleman et al. | |
| 8,838,979 | B2 | 9/2014 | Srinivasan | |
| 9,199,362 | B2 | 12/2015 | Eshleman et al. | |
| 9,211,636 | B2 | 12/2015 | Eshleman et al. | |
| 9,216,504 | B2 | 12/2015 | Zhang et al. | |
| 9,266,178 | B2 | 2/2016 | Eshleman et al. | |
| 9,266,230 | B2 | 2/2016 | Maddilate et al. | |
| 9,289,886 | B2 | 3/2016 | Limberg et al. | |
| 9,321,155 | B2 | 4/2016 | Eshleman et al. | |
| 9,321,156 | B2 | 4/2016 | Eshleman et al. | |
| 9,450,471 | B2 | 9/2016 | Mergener et al. | |
| 9,475,180 | B2 | 10/2016 | Eshleman et al. | |
| 9,774,229 | B1 | 9/2017 | Mergener et al. | |
| 9,787,159 | B2 | 10/2017 | Beyerl | |
| 9,954,417 | B2 | 4/2018 | Mergener et al. | |
| 9,960,656 | B2 | 5/2018 | Mergener et al. | |
| 10,052,733 | B2 | 8/2018 | Ely et al. | |
| 10,160,049 | B2 | 12/2018 | Eshleman et al. | |
| 10,205,365 | B2 | 2/2019 | Beyerl | |
| 10,272,550 | B2 | 4/2019 | Dey, IV et al. | |
| 10,298,098 | B2 | 5/2019 | Niwa | |
| 10,348,158 | B2 | 7/2019 | Niwa et al. | |
| 10,348,159 | B2 | 7/2019 | Beyerl | |
| 10,357,871 | B2 | 7/2019 | Thorson et al. | |
| 10,406,662 | B2 | 9/2019 | Leh et al. | |
| 10,427,282 | B2 | 10/2019 | Ishikawa et al. | |
| 10,432,045 | B2 | 10/2019 | Hessenberger et al. | |
| 10,432,065 | B2 | 10/2019 | Beyerl et al. | |
| 10,471,573 | B2 | 11/2019 | Howard et al. | |
| 10,583,545 | B2 | 3/2020 | Dey, IV et al. | |
| 10,587,163 | B2 * | 3/2020 | Crosby | H02K 7/145 |
| 10,646,982 | B2 | 5/2020 | Dey, IV et al. | |
| 10,668,614 | B2 | 6/2020 | Bartoszek et al. | |
| 10,673,305 | B2 | 6/2020 | Beyerl et al. | |
| 10,821,591 | B2 | 11/2020 | Verbrugge et al. | |
| 10,926,383 | B2 | 2/2021 | Scott et al. | |
| 10,931,167 | B2 | 2/2021 | Beyerl et al. | |
| 10,960,509 | B2 | 3/2021 | Ely et al. | |
| 10,960,529 | B2 | 3/2021 | Herr et al. | |
| 10,987,784 | B2 | 4/2021 | Seith | |
| 11,027,404 | B2 | 6/2021 | Malak et al. | |
| 11,031,843 | B2 | 6/2021 | Mergener et al. | |
| 11,073,203 | B2 * | 7/2021 | Nakashima | B25B 21/02 |
| 11,148,275 | B2 | 10/2021 | Herr et al. | |
| 11,179,840 | B2 | 11/2021 | Herr et al. | |
| 11,420,308 | B2 | 8/2022 | Kondo | |
| 11,642,772 | B2 * | 5/2023 | Nakashima | H02K 11/0094 173/217 |
| 2009/0114412 | A1 | 5/2009 | Hatfield | |
| 2009/0223690 | A1 * | 9/2009 | Sugimoto | B25B 21/026 173/48 |
| 2011/0152029 | A1 * | 6/2011 | Rudolph | B25B 21/02 475/331 |
| 2012/0000684 | A1 | 1/2012 | Sugimoto | |
| 2012/0006573 | A1 | 1/2012 | Sugimoto | |
| 2012/0072845 | A1 * | 3/2012 | John | G06F 16/48 707/E17.046 |
| 2012/0318548 | A1 | 12/2012 | Hirabayashi et al. | |
| 2013/0062088 | A1 | 3/2013 | Mashiko | |
| 2013/0255982 | A1 * | 10/2013 | Takahashi | B25B 21/02 173/47 |
| 2013/0333910 | A1 * | 12/2013 | Tanimoto | B25B 21/02 173/176 |
| 2014/0124230 | A1 * | 5/2014 | Johnson | B25F 5/02 173/162.1 |
| 2014/0182869 | A1 * | 7/2014 | Kumagai | B25F 5/008 173/93 |
| 2015/0041169 | A1 * | 2/2015 | Kumagai | B25D 17/26 173/93.7 |
| 2015/0352699 | A1 | 12/2015 | Sakai et al. | |
| 2016/0075004 | A1 | 3/2016 | Tsubakimoto et al. | |
| 2016/0121467 | A1 * | 5/2016 | Ng | B25B 23/1475 81/464 |
| 2017/0294819 | A1 * | 10/2017 | Crosby | B25F 5/008 |
| 2019/0118352 | A1 | 4/2019 | Weber | |
| 2019/0160636 | A1 | 5/2019 | Hirabayashi et al. | |
| 2019/0232469 | A1 | 8/2019 | Carlson et al. | |
| 2019/0255687 | A1 | 8/2019 | Schneider et al. | |
| 2019/0344411 | A1 | 11/2019 | Leh et al. | |
| 2020/0023501 | A1 | 1/2020 | Bandy et al. | |
| 2020/0171632 | A1 | 6/2020 | Dey, IV et al. | |
| 2020/0180124 | A1 | 6/2020 | Ellice et al. | |
| 2020/0180128 | A1 | 6/2020 | Schneider et al. | |
| 2020/0198100 | A1 | 6/2020 | Schneider et al. | |
| 2020/0215678 | A1 | 7/2020 | Nakashima | |
| 2020/0217412 | A1 | 7/2020 | Nakashima | |
| 2020/0230789 | A1 | 7/2020 | Dey, IV et al. | |
| 2020/0262037 | A1 | 8/2020 | Schneider et al. | |
| 2020/0282540 | A1 | 9/2020 | Bartoszek et al. | |
| 2020/0306942 | A1 | 10/2020 | Koenig et al. | |
| 2021/0016428 | A1 | 1/2021 | Nakashima | |
| 2021/0031342 | A1 | 2/2021 | Takahagi | |
| 2021/0046630 | A1 | 2/2021 | Verbrugge et al. | |
| 2021/0060741 | A1 | 3/2021 | Kusumoto | |
| 2021/0138616 | A1 | 5/2021 | Scott et al. | |
| 2021/0162574 | A1 | 6/2021 | Dedrickson | |
| 2021/0276164 | A1 | 9/2021 | Kumagai et al. | |
| 2021/0331306 | A1 * | 10/2021 | Ito | B25F 5/02 |
| 2021/0362308 | A1 | 11/2021 | Li et al. | |
| 2022/0040829 | A1 | 2/2022 | Schneider et al. | |

FOREIGN PATENT DOCUMENTS

| | | | |
|---|---|---|---|
| CN | 212601568 | U | 2/2021 |
| CN | 215148601 | U | 12/2021 |
| CN | 116141271 | A | 5/2023 |
| EP | 2402117 | A1 | 1/2012 |
| JP | 5224097 | B2 | 7/2013 |
| JP | 2017007032 | A | 1/2017 |
| WO | 2018163561 | A1 | 9/2018 |
| WO | 2023102108 | A1 | 6/2023 |

OTHER PUBLICATIONS

UK Intellectual Property Office, Examination Report issued in corresponding Application No. GB2403176.7, dated Jun. 26, 2025, 5 pp.

Canadian Patent Office, Examination Report issued in corresponding Application No. 3,233,883, dated Aug. 25, 2025, 4 pp.

Taiwan Patent Office, Office Action issued in corresponding Application No. 113111639, dated Feb. 18, 2025, 15 pp.

Australian Patent Office, Examination Report No. 1 issued in corresponding Application No. 2024201657, dated Apr. 1, 2025, 7 pp.

UK Intellectual Property Office, Combined Search and Examination Report issued in corresponding Application No. GB2504547.7, dated Apr. 22, 2025, 8 pp.

UK Intellectual Property Office, Combined Search and Examination Report issued in corresponding Application No. GB2504546.9, dated Apr. 23, 2025, 8 pp.

UK Intellectual Property Office, Examination Report issued in corresponding Application No. GB2504546.9, dated Oct. 8, 2025, 6 pp.

Taiwan Patent Office, Second Office Action issued in corresponding Application No. 113111639, dated Sep. 2, 2025, 15 pp.

EP Patent Office, Office Action in corresponding application No. 2024103608991, dated Jun. 13, 2026.

* cited by examiner

IMPACT WRENCH

TECHNICAL FIELD OF THE INVENTION

The present invention relates generally to impact tools, and more particularly nose housings and impact mechanisms for impact tools.

BACKGROUND OF THE INVENTION

Power tools, such as impact wrenches, drills, and other pistol grip type tools, are commonly used to complete industrial or home improvement tasks. Many power tools are portable and electrically powered, such as with a rechargeable battery, allowing a user to apply torque or force on a workpiece without exerting a substantial amount of energy. Impact wrenches generally include a housing that houses an impact mechanism, motor, and electronic components for controlling the motor. However, traditional pistol grip tools, such as impact wrenches, are often long and large, and cannot be used or are difficult to use in tight areas. Thus, instead of using a power tool to reach in tight areas, a hand tool must be used, which is inefficient.

SUMMARY OF THE INVENTION

The present invention relates broadly to pistol grip tools, such as an impact wrench, that is smaller than traditional pistol grip tools to allow use in tight work areas. To minimize size and length, the tool includes a tool housing, a frameless motor, a rear motor bearing supported in a bearing pocket in the tool housing, a nose housing coupled to the tool housing that supports and aligns a ring gear, bearing assembly, and impact mechanism with an axis of the motor, and a nose bushing with an integral grease groove and seal. For example, the tool may include frameless overlapping ring gear and front motor bearings with a front motor bearing integral with a gear carrier of the impact mechanism.

In an embodiment, the present invention relates broadly to an pistol grip impact tool including a motor with a motor shaft. The impact tool includes a tool housing, wherein a motor is disposed in the tool housing, and a nose housing coupled to the tool housing. The impact tool also includes a front motor bearing disposed on a front portion of the motor shaft, a gear carrier extending into the nose housing and having a front motor bearing recess that receives the front motor bearing, and a gear carrier outer bearing surface. The impact tool also includes a ring gear bearing disposed on the gear carrier outer bearing surface, and a ring gear having opposing first and second ring gear ends, a ring gear bearing recess proximal to the first ring gear end and that receives the ring gear bearing, wherein the second ring gear end is disposed in and supported by the nose housing, and wherein the front motor bearing and the ring gear bearing overlap in a radial direction.

In another embodiment, the present invention relates broadly to an impact tool including a tool housing that includes an inner surface with a rear motor bearing pocket formed in the inner surface, a motor disposed in the tool housing and including a motor shaft with front and rear portions, a front motor bearing disposed on the front portion, and a rear motor bearing disposed on the rear portion, wherein the rear motor bearing is disposed in the rear motor bearing pocket.

BRIEF DESCRIPTION OF THE DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages, should be readily understood and appreciated.

DETAILED DESCRIPTION

Figure 1:
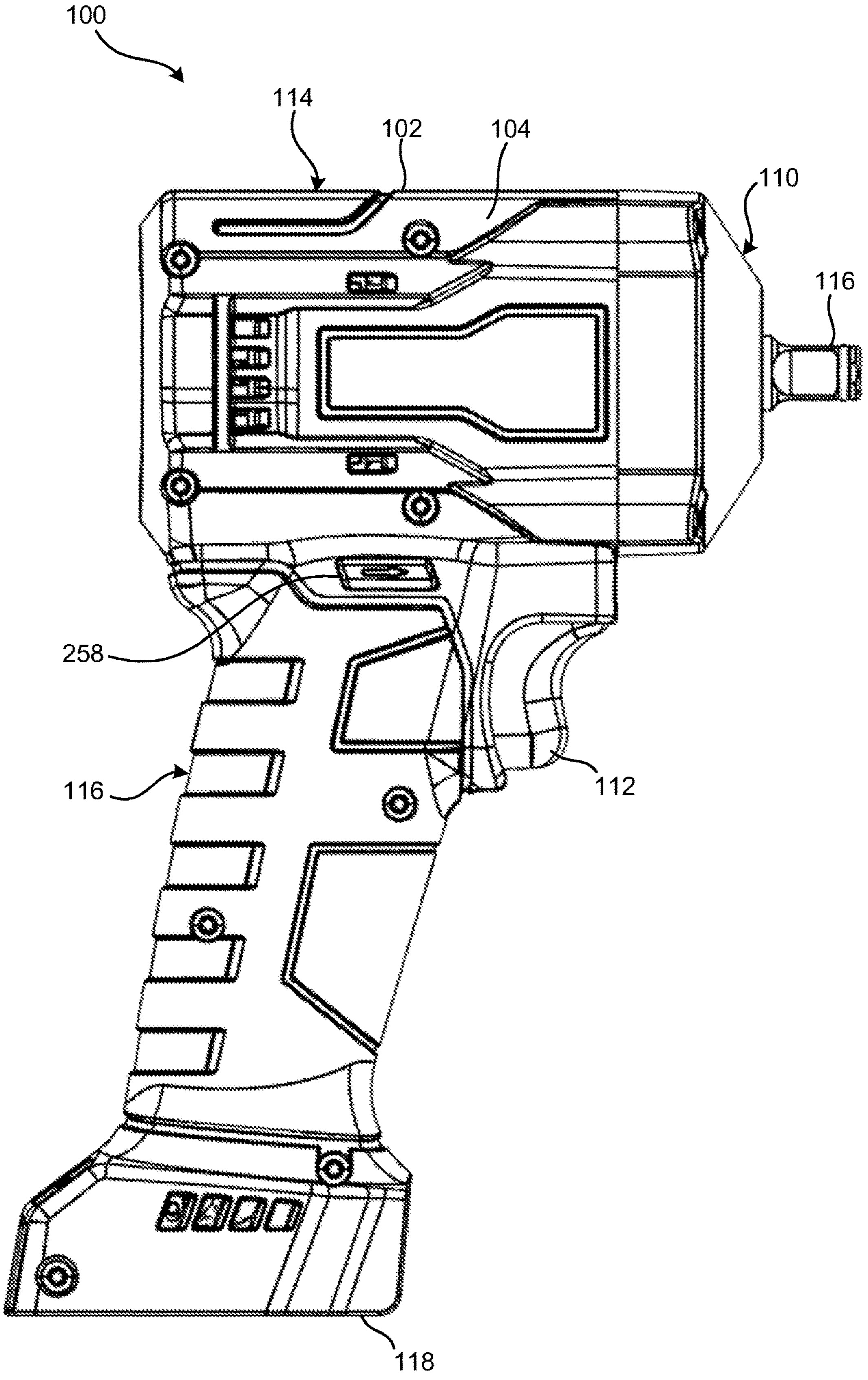
FIG. 1 is a side view of an exemplar impact type tool, according to an embodiment of the present invention.

While the present invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention relates broadly to a pistol grip tool, such as an impact wrench, that is more compact and smaller than traditional impact wrenches, to allow for use in tight work areas. To minimize size and length, the tool includes a tool housing, a frameless motor, a rear motor bearing supported in a bearing pocket disposed in the tool housing, a nose housing coupled to the tool housing that supports and aligns a ring gear, bearing assembly, an impact mechanism with an axis of the motor, and a nose bushing with an integral grease groove and seal. For example, the tool may include frameless overlapping ring gear and front motor bearings, with a front motor bearing being integral with a gear carrier of the impact mechanism.

Figure 2:
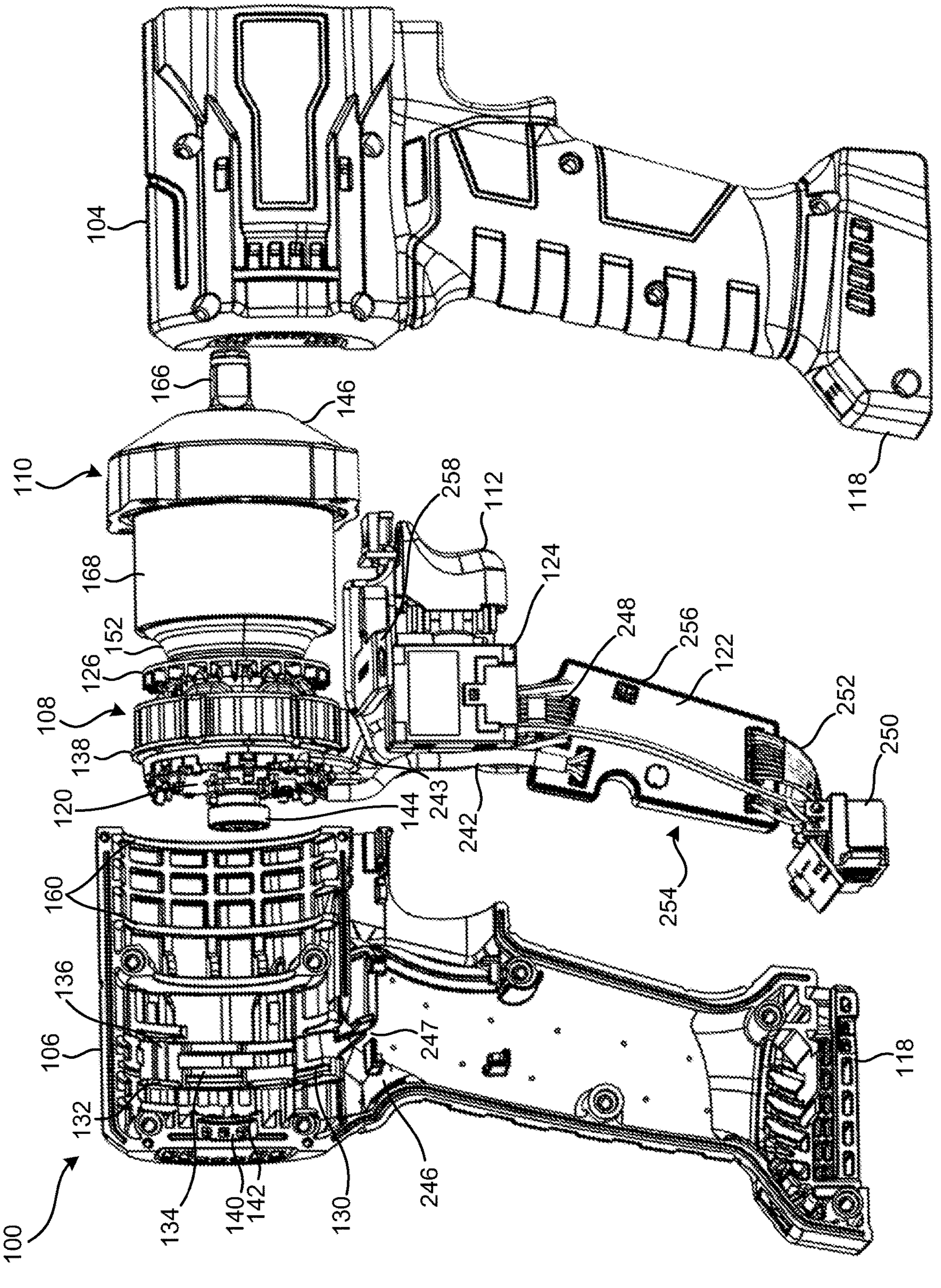
FIG. 2 is a partial exploded perspective view of the exemplar tool of FIG. 1.

Referring to FIGS. 1 and 2, a tool 100 (such as a cordless impact wrench) is illustrated. The tool 100 includes a housing 102 (also referred to as a tool housing) having first and second housing portions 104, 106 (respectively forming first and second sides of the housing 102), a motor 108 disposed in the housing 102, an output nose mechanism 110 coupled to the housing 102 at a front or working end of the tool 100 and operably coupled to the motor 108, and an actuatable trigger 112 adapted to operate the motor 108 and thereby the output nose mechanism 110.

In an embodiment, the housing 102 is a clamshell-type housing having first and second housing portions 104, 106 that are mirror images of each other and coupled together via fasteners to cooperatively form the housing 102. In another embodiment, the housing 102 (including the first and second housing portions 104, 106) may be a single integrated or monolithic piece. The housing 102 includes a motor housing portion 114 and a handle housing portion 116 formed by the first and second housing portions 104, 106. The handle housing portion 116 may extend from the motor housing portion 114 to a power source receiving end 118 adapted to receive and couple to a power source, such as a removable battery pack, for providing power to the tool 100. In an embodiment, the motor housing portion 114 and handle housing portion 116 may be disposed at an angle relative to each other, thus forming a pistol-grip type tool. For example, in an embodiment, a longitudinal axis of the motor housing portion 114 and a longitudinal axis of the handle housing portion 116 may be disposed at an angle of about 100 to about 120 degrees, and preferably about 110 degrees relative to each other.

Figure 3:
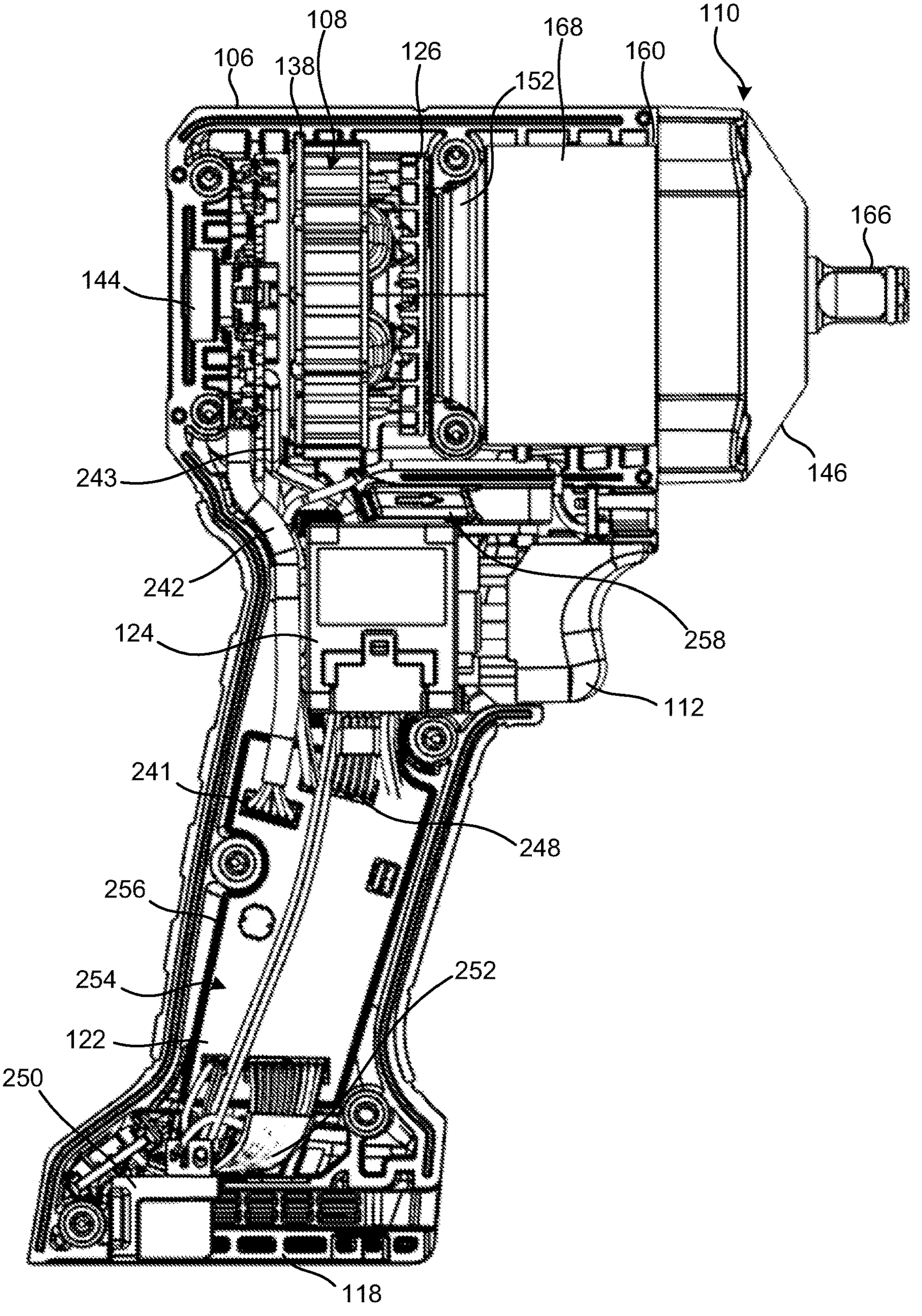
FIG. 3 is side view of the exemplar tool of FIG. 1 with a first housing portion removed showing exemplar internal components of the tool.
Figure 4:
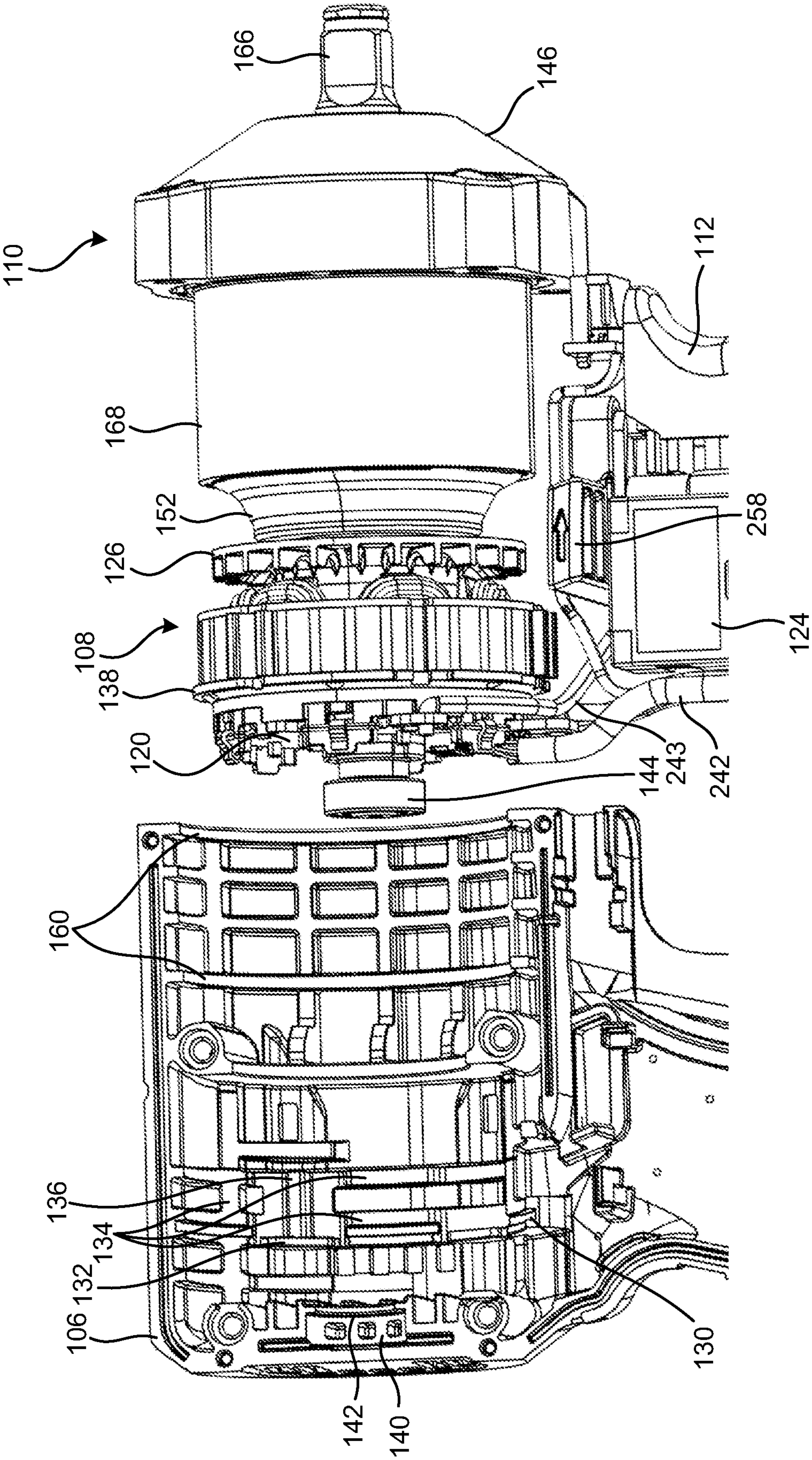
FIG. 4 is an enlarged, perspective view of a motor and output nose mechanism of the exemplar tool of FIG. 1, with the motor and output nose mechanism shown exploded from a second housing portion of the tool.
Figure 5:
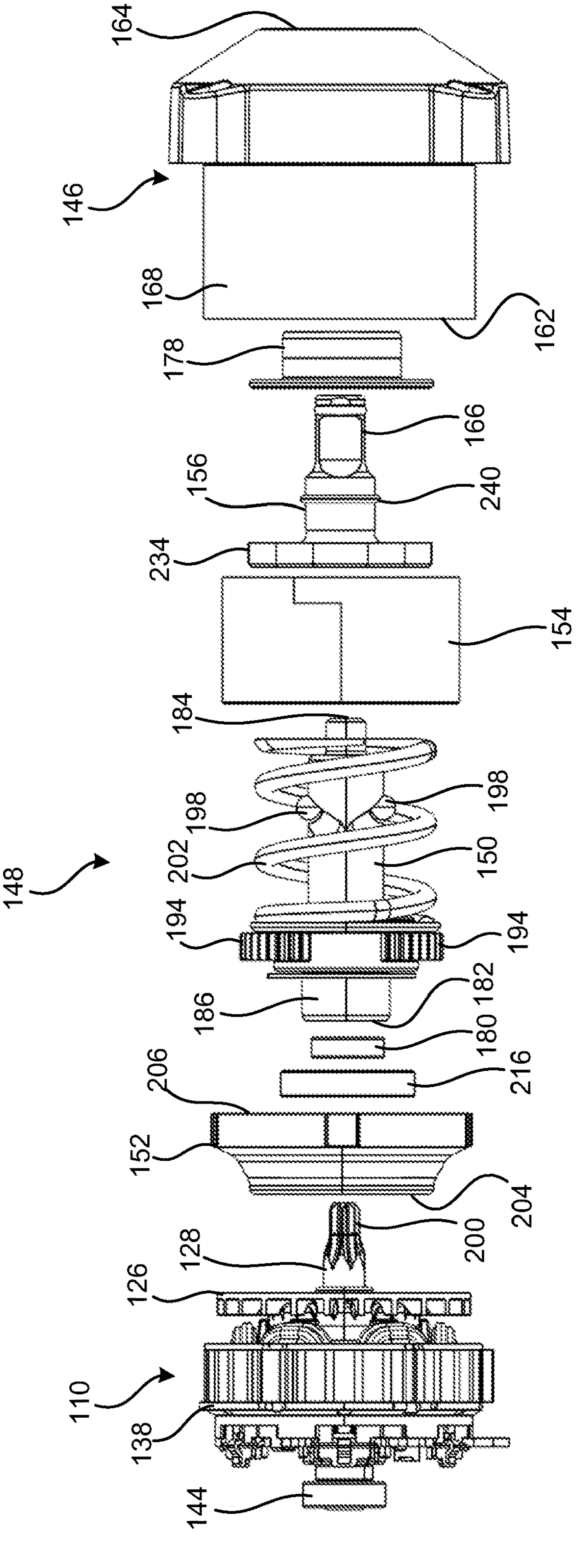
FIG. 5 is an enlarged, exploded side view of the motor and output nose mechanism of the exemplar tool of FIG. 1, according to an embodiment of the present invention.

Referring to FIGS. 2-4, the motor 108 is disposed in and supported in the motor housing portion 114, proximal to a rear end of the housing 102, and operably coupled to the trigger 112 via motor control electronics 120, a controller 122, and/or switching mechanism 124. The motor 108 may be a frameless brushless DC (BLDC) or a brushed-type motor, or any other suitable motor (e.g., pneumatically or hydraulically operated or AC operated motor). The motor 108 may include a motor fan 126, and a motor shaft 128 (as shown in FIG. 5) that is operably coupled to the output nose mechanism 110. Thus, actuation of the trigger 112 by a user (such as depression of the trigger 112) causes the motor 108 to operate and operate the output nose mechanism 110.

The motor 108 is supported in the motor housing portion 114 via one or more internal surface features of the first and second housing portions 104, 106. For example, the first and second housing portions 104, 106 each includes one or more recesses and cooperative inwardly protruding ribs, such as recess 130 and motor ribs 132, 134, 136, that receive and/or support the motor 108 (such as a stator 138 of the motor 108) in the motor housing portion 114 of the housing 102. The motor ribs 134 abut an exterior of the motor 108 (such as an exterior of the stator 138 or stator exterior surface) and restrict radial movement of the motor 108 with respect to the housing 102. The recess 130 is formed by opposing side surfaces of the motor ribs 132 and 134, and receives a flange portion of the stator 138 to restrict longitudinal or axial movement of the motor 108 with respect to the housing 108. For example, the opposing side surfaces of the motor ribs 132 and 134 may sandwich the flange portion of the motor 108, with the side surface of the motor rib 132 acting as a rear stop and the side surface of the motor rib 134 acting as a forward stop to restrict axial movement of the motor 108 with respect to the housing 102. Additionally, the motor rib 136 may extend in the axial direction and act as an anti-rotation rib that is received in a corresponding groove 137 (shown in FIG. 13) to restrict rotational movement of the stator 138 with respect to the housing 102.

The first and second housing portions 104, 106 each further includes a recess 140 formed in an inner surface proximal to a rear end of the housing 102. The recesses 140 form a rear motor bearing pocket with a ledge 142 that receives, holds, and supports a rear motor bearing 144 disposed on a rear end of the motor shaft 128 when the first and second housing portions 104, 106 are coupled together. For example, the rear motor bearing 144 is disposed in the rear motor bearing pocket with the ledge 142 disposed between the rear motor bearing 144 and the motor 108.

Referring to FIGS. 2-6, the output nose mechanism 110 includes a nose housing 146 and an impact mechanism 148 including a gear carrier 150, a ring gear 152, a hammer 154, and an anvil 156. The nose housing 146 is adapted to be supported in the tool housing 102 and coupled to the tool housing 102 via fasteners or other means. For example, the first and second housing portions 104, 106 may each include one or more internal surface features, such as inwardly protruding nose housing ribs 160. When the output nose mechanism 110 is assembled to the tool housing 102, the inwardly protruding nose housing ribs 160 are adapted to support a nose housing exterior surface or outer diameter of the nose housing 146. The inwardly protruding nose housing ribs 160 also provide alignment of the output nose mechanism 110 (via alignment of the ring gear 152 and nose housing 146) with an output axis of the motor 108.

Accordingly, the internal surface features of the first and second housing portions 104, 106 provide for alignment of the motor 108 in the housing 102. For example, the motor ribs 132 and 134, in combination with the rear motor bearing pocket, hold and align the motor 108 within the housing 102. The nose housing ribs 160 also hold and align the output nose mechanism 110 (via alignment of the nose housing 146) with the motor 108. Thus, the internal surface features of the first and second housing portions 104, 106 support and align the motor 108 and the output nose mechanism 110 (via alignment of the nose housing 146) with each other.

Figure 6:
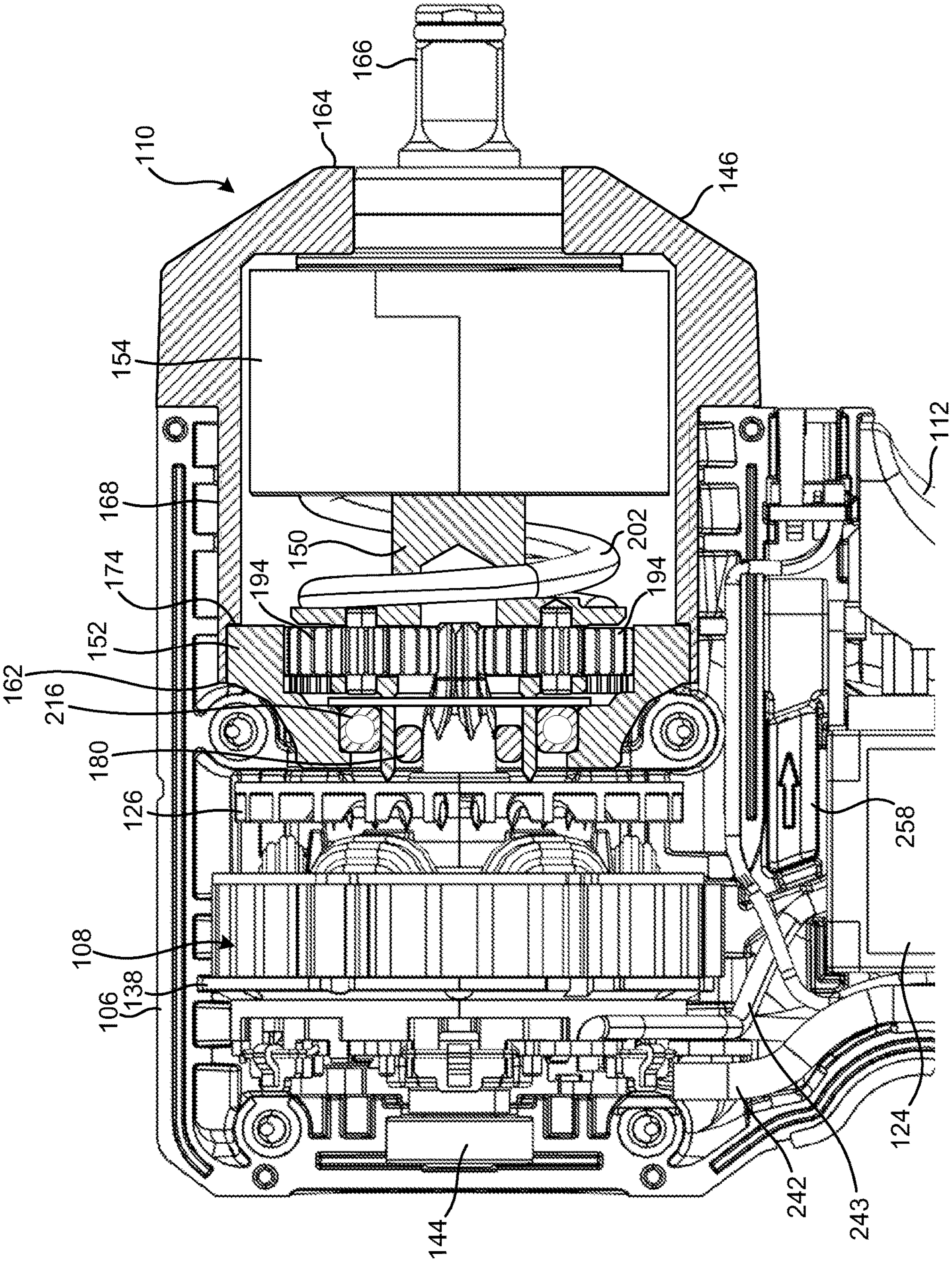
FIG. 6 is an enlarged, partial section view of a ring gear, gear carrier, nose housing, front motor bearing, and ring gear bearing of the exemplar tool of FIG. 1, according to an embodiment of the present invention.
Figure 7:
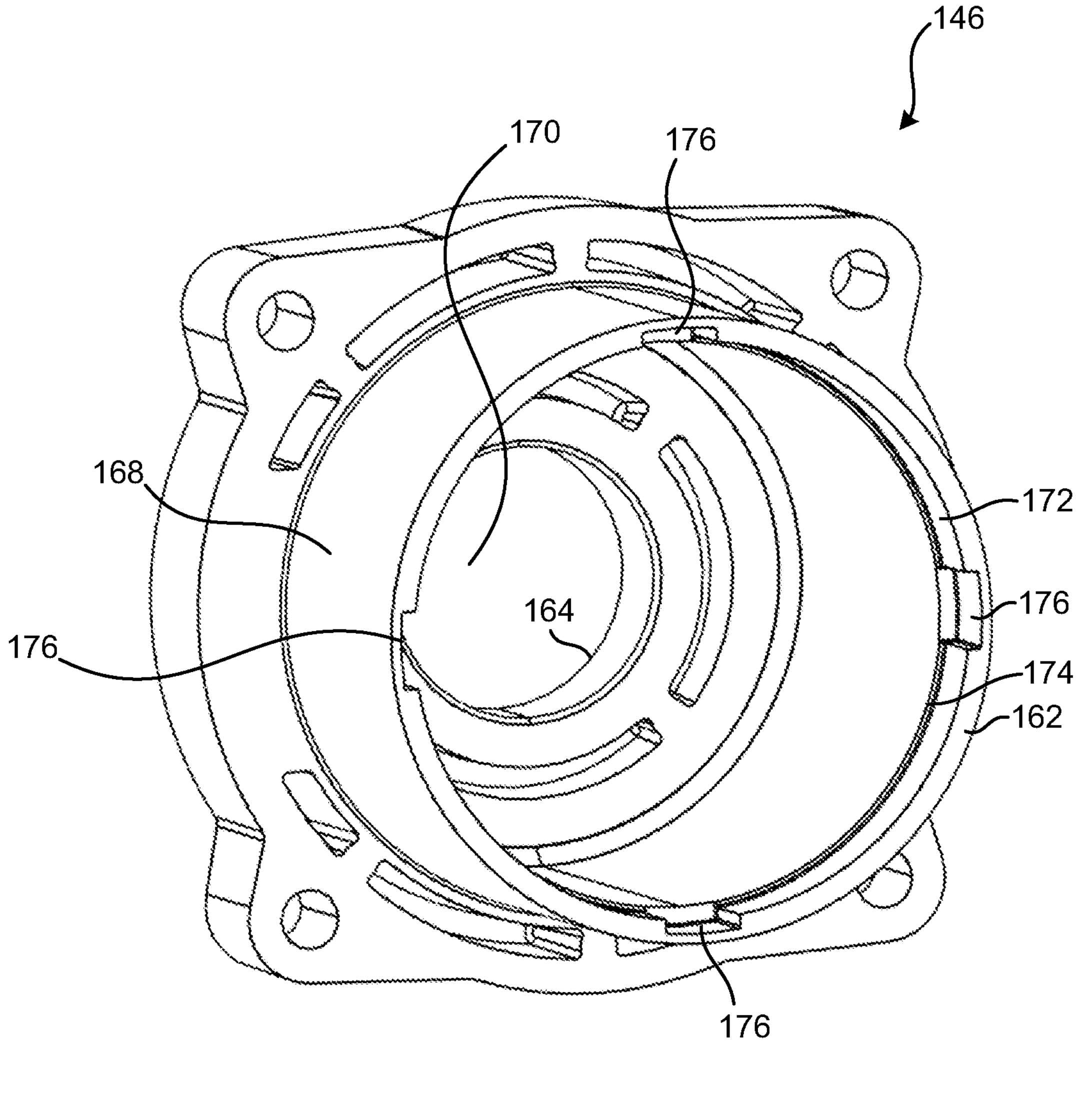
FIG. 7 is an enlarged, perspective view of the nose housing of the exemplar tool of FIG. 1, according to an embodiment of the present invention.
Figure 9:
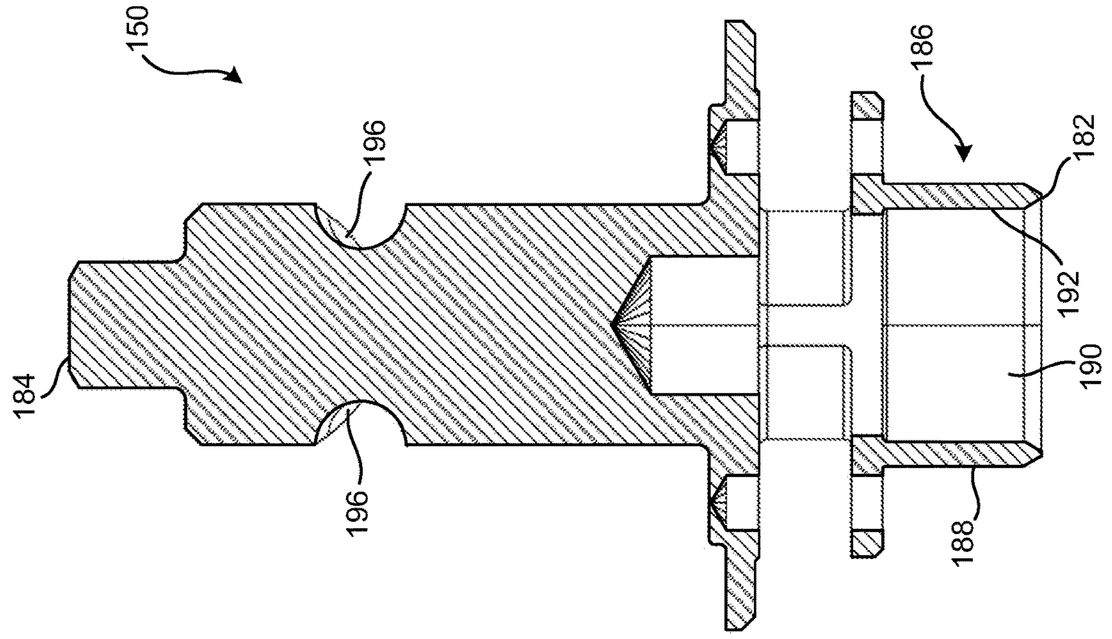
FIG. 9 is an enlarged, section view of a gear carrier of the exemplar tool of FIG. 1, according to an embodiment of the present invention.
Figure 8:
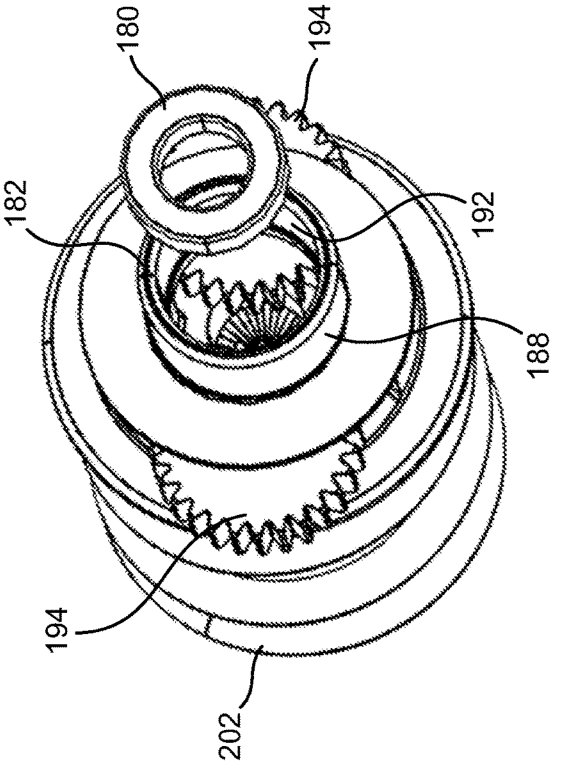
FIG. 8 is an enlarged, exploded perspective view of a gear carrier and front motor bearing of the exemplar tool of FIG. 1, according to an embodiment of the present invention.
Figure 11:
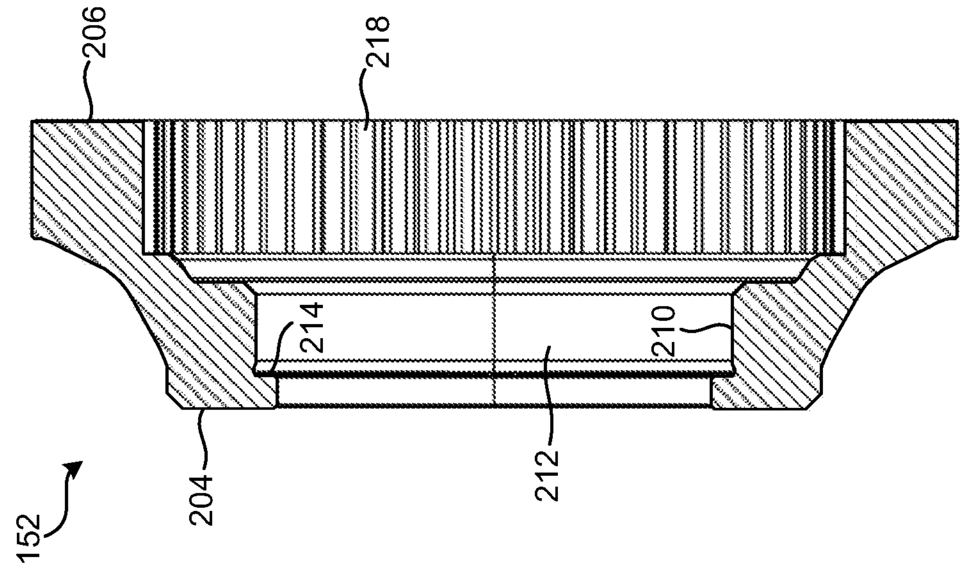
FIG. 11 is an enlarged section view of the ring gear taken along A-A of FIG. 10, according to an embodiment of the present invention.
Figure 10:
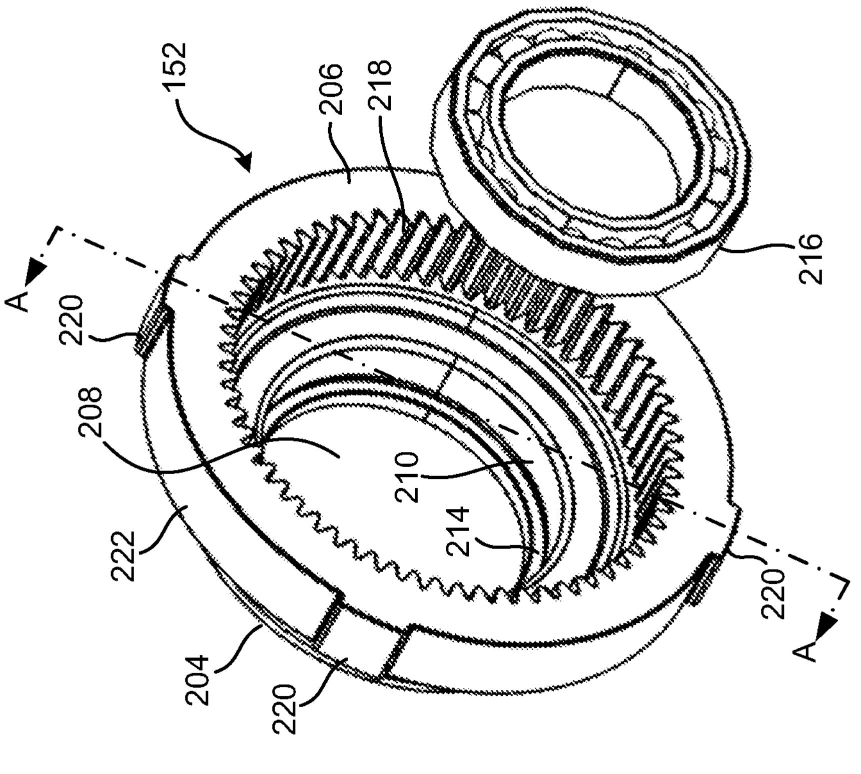
FIG. 10 is an exploded perspective view of a ring gear and ring gear bearing of the exemplar tool of FIG. 1, according to an embodiment of the present invention.

Referring to FIGS. 5-7, the nose housing 146 is adapted to house the impact mechanism 148 and support and couple to a ring gear exterior surface or outer diameter of the ring gear 152. In general, the nose housing 146 includes opposing first and second nose housing ends 162, 164. The gear carrier 150 is operably coupled to the ring gear 152, hammer 154, and anvil 156, and the ring gear 152 is coupled to the nose housing 146 at the first nose housing end 162, with the gear carrier 150, hammer 154, and anvil 156 disposed in the nose housing 146, and an output drive lug 166 of the anvil 156 extending out of the second nose housing end 164.

For example, the nose housing 146 includes an outer surface 168 proximal to the first nose housing end 162 that is adapted to be disposed in and supported by the tool housing 102, and an aperture 170 extending through the nose housing 146. Proximal to the first nose housing end 162, the nose housing 146 includes an inner engagement surface 172 that extends from the first nose housing end 162 into the nose housing 146 to a stop or ledge 174. The inner engagement surface 172 includes one or more anti-rotation grooves 176 that are adapted to matingly engage the ring gear 152 and support the ring gear exterior surface or outer diameter of the ring gear 152. The second nose housing end 164 is adapted to receive a nose bushing 178 that receives and supports the output drive lug 166 of the anvil 156 extending outwardly from the second nose housing end 164.

Referring to FIGS. 5, 6, and 8-9, the gear carrier 150 is operably coupled to the motor shaft 128 via a front motor bearing 180 and is adapted to receive rotational force from the motor 108 and transfer the rotational force to the hammer 154 and anvil 156. The gear carrier—150 includes opposing first and second gear carrier ends 182, 184, and a bearing engagement portion 186 proximal to the first gear carrier end 182. The first gear carrier end 182 is operably coupled to the motor shaft 128, and the second gear carrier end 184 is received in the anvil 156. Thus, the gear carrier 150 is supported by the motor shaft 128 at the first gear carrier end 182 and the anvil 156 at the second gear carrier end 184, which provides axial alignment of the gear carrier 150 and anvil 156 with the motor shaft 128.

The bearing engagement portion 186 includes an outer bearing surface 188 and a front motor bearing recess 190 in the first gear carrier end 182 forming an inner bearing surface 192 (such that the inner bearing surface 192 surrounds front motor bearing recess 190) and is adapted to receive the front motor bearing 180. For example, the front motor bearing 180 may be disposed on the motor shaft 128, with an inner diameter of the front motor bearing 180 engaged (such as via interference or press-fit engagement) with an outer surface of the motor shaft 128, and an outer diameter of the front motor bearing 180 engaged (such as via clearance-fit engagement) with the inner bearing surface 192 of the gear carrier 150. In other words, the first gear carrier end 182 can be disposed over the front motor bearing 180, with the front motor bearing 180 being disposed in the front motor bearing recess 190 and the outer diameter of the front motor bearing 180 clearance-fit against the inner bearing surface 192 of the gear carrier 150. Thus, the gear carrier 150 is clearance-fit with the front motor bearing 180 to be integrally coupled to the front motor bearing 180. The integral nature of the gear carrier 150 and front motor bearing 180 provides axial alignment of the gear carrier 150 with the motor shaft 128 and output axis of the motor 108.

The gear carrier 150 also includes planet gears 194 operably coupled to the gear carrier 150, and gear carrier ball grooves 196 that respectively receive balls 198. When the gear carrier 150 is installed on the motor shaft 128 (via the front motor bearing 180), the motor shaft 128 extends into the first gear carrier end 182 and is disposed between the planet gears 194. Planet gear teeth of the planet gears 194 meshingly engage sun gear teeth of a sun gear 200 on a front of the motor shaft 128. This allows the motor shaft 128 to rotate the gear carrier 150, as described below. The gear carrier ball grooves 196 are disposed between the first and second gear carrier ends 182, 184, proximal to the second gear carrier end 184, and are adapted to respectively receive balls 198. The gear carrier ball grooves 196 and balls 198 are adapted to move the hammer 154 axially against a bias force of bias member 202 and away from the anvil 156 when a minimum amount of torque is reached, as discussed below.

Referring to FIGS. 5, 6, 10, and 11, the ring gear 152 includes opposing first and second ring gear ends 204, 206, and an aperture 208 extending through the ring gear 152 and forming an inner surface. A ring gear bearing recess 210 is formed in the inner surface proximal to the first ring gear end 204. An inner bearing surface 212 surrounds the ring gear bearing recess 210 and ends at a stop or ledge 214. As illustrated, the inner bearing surface 212 is disposed between the stop or ledge 214 and the second ring gear end 206. The inner bearing surface 212 is adapted to interference fit or press fit with a ring gear bearing 216.

The ring gear bearing 216 is disposed in the ring gear bearing recess 210 from the second ring gear end 206 and into abutting engagement with the stop or ledge 214, and the ring gear bearing 216 is disposed on the outer bearing surface 188 of the gear carrier 150, with an inner diameter of the ring gear bearing 216 engaged (such as via clearance-fit engagement) with the outer bearing surface 188 of the gear carrier 150, and an outer diameter of the ring gear bearing 216 engaged (such as via interference or press-fit engagement) with the inner bearing surface 212 of the ring gear 152. Thus, the gear carrier 150 is clearance-fit with the front motor bearing 180 and ring gear bearing 216 to be integrally coupled to the front motor bearing 180 and ring gear bearing 216, and the ring gear 152 is interference-fit or press-fit with the ring gear bearing 216 to be integrally coupled to the ring gear bearing 216. The front motor bearing 180 and ring gear bearing 216 may also overlap in a radial direction. The compact and integral nature of the gear carrier 150, front motor bearing 180, ring gear bearing 216, and ring gear 152 provides support and alignment of the gear carrier 150 and ring gear 152 with the motor shaft 128 and output axis of the motor 108, and provides a smaller more compact, or reduced profile size and length of the tool 100, compared to other similar conventional tools.

The ring gear 152 further includes an opening at the second ring gear end 206 and ring gear teeth 218 disposed on an inner surface of the opening proximal to the second ring gear end 206. The ring gear teeth 218 are adapted to meshingly engage planet gear teeth of the planet gears 194. Thus, when motor 108 is operated to rotate the motor shaft 128, the ring gear 152 is stationary (via anti-rotation tabs or protrusions 220 and anti-rotation grooves 176 described below), and the sun gear 200 of the motor shaft 128 causes the planet gears 194 to rotate around the ring gear 152 via engagement with the ring gear teeth 218, thereby causing the gear carrier 150 to rotate.

The ring gear 152 further includes one or more anti-rotation tabs or protrusions 220 on an exterior surface 222 (also referred to as the ring gear exterior surface) of the ring gear 152, proximal to the second ring gear end 206. The anti-rotation tabs or protrusions 220 are adapted to be respectively aligned with and disposed in the anti-rotation grooves 176 of the nose housing 146 to hold the ring gear 152 stationary with respect to the nose housing 146. When assembled with the nose housing 146, the second ring gear end 206 is disposed in the first nose housing end 162 abutting the stop or ledge 174, with the exterior surface 222 of the ring gear 152 abutting the inner engagement surface 172 of the nose housing 146 and the anti-rotation tabs or protrusions 220 respectively aligned with and disposed in the anti-rotation grooves 176. Thus, the ring gear 152 is supported and held in place by the nose housing 146, via the exterior surface 222 of the ring gear 152 being disposed in the nose housing 146, and the exterior surface or outer diameter of the gear carrier 150 is supported by the ring gear 152, via the engagement of the ring gear 152 and gear carrier 150 with the ring gear bearing 216. This provides axial alignment of the gear carrier 150, ring gear 152, and nose housing 146 with the motor shaft 128 and output axis of the motor 108.

Figure 12:
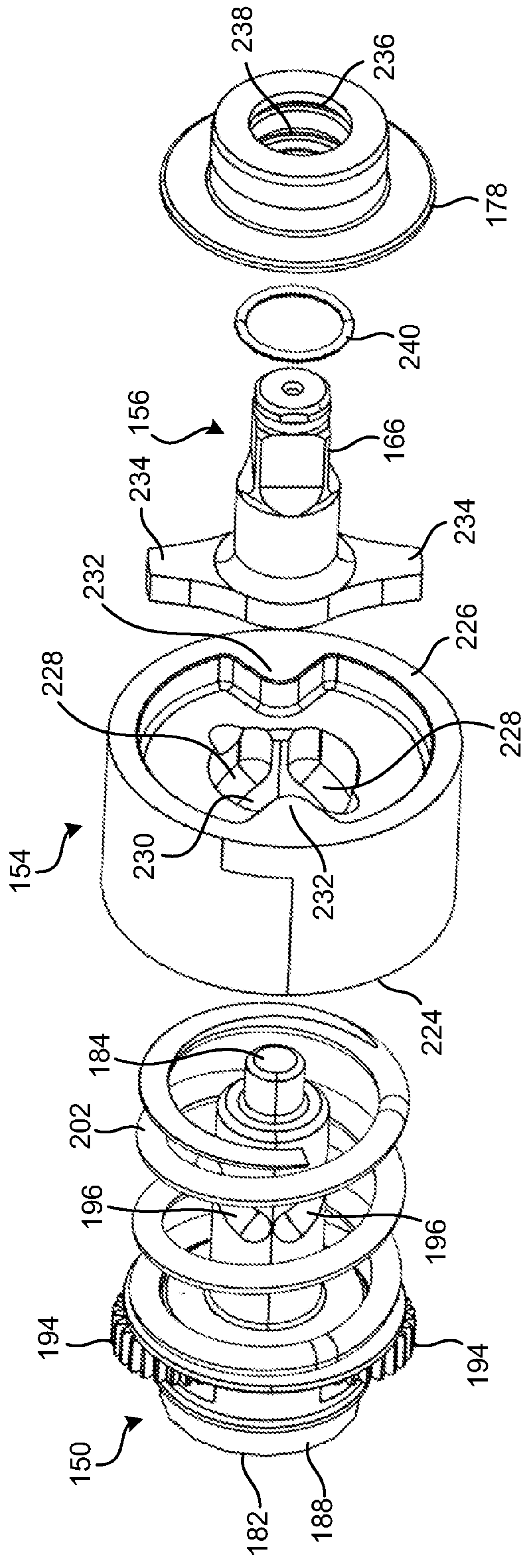
FIG. 12 is an exploded, perspective view of a gear carrier, hammer, anvil, and nose bushing of the exemplar tool of FIG. 1, according to an embodiment of the present invention.

Referring to FIGS. 5, 6, and 12, the hammer 154 includes first and second hammer ends 224, 226, and an aperture extending through the hammer 154. The first hammer end 224 is adapted to be disposed over the gear carrier 150, with the gear carrier 150 extending through the aperture, and the second gear carrier end 184 extending outwardly from the second hammer end 226. The hammer 154 includes hammer ball grooves 228 on an inner surface 230 that respectively receive balls 198. The hammer 154 also includes one or more hammer lugs 232 proximal to the second hammer end 226 that are adapted to impact the anvil 156, as described below.

The biasing member 202 is also disposed on the gear carrier 150 and extends into the aperture of the hammer 154 from the first hammer end 224. The biasing member 202 provides a biasing force between the hammer 154 and the gear carrier 150 in a direction axially away from the gear carrier 150. The biasing member 202 can be, for example, a spring and is adapted to apply the bias force to axially bias the hammer 154 away from the gear carrier 150 and towards the anvil 156.

The anvil 156 is adapted to be disposed on and receive the second gear carrier end 184. The anvil 156 includes one or more impact sections 234 (also known as anvil wings) extending radially outwardly, and includes or is coupled to the output drive lug 166 that is adapted to receive and directly or indirectly couple to a variety of tool bits or sockets (including, driver bits, drill bits, cutting bits, socket bits, grinding bits, etc.), in a well-known manner. The impact sections 234 are adapted to receive impact force from the hammer lugs 232 to drive the output drive lug 166.

The nose bushing 178 is assembled in the nose housing 146 through the first nose housing end 162 and is disposed in the second nose housing end 164. The nose bushing 178 includes an aperture, and the output drive lug 166 extends through the aperture and outwardly from the second nose housing end 164. The nose bushing 178 may include first and second internal grooves 236, 238. The first internal groove 236 may be adapted to receive a seal 240 to provide a seal between the nose bushing 178 and the anvil 156, and the second internal groove 238 may be adapted to receive grease or other lubricant to provide lubrication between the nose bushing 178 and the anvil 156.

Referring to FIGS. 5 and 6, when the output nose mechanism 110 is assembled, the nose bushing 178 is assembled into the nose housing 146 through the first nose housing end 162 and is disposed in the aperture in the second nose housing end 164. The anvil 156 is assembled into the nose housing 146 through the first nose housing end 162, with the output drive lug 166 extending outwardly from the nose bushing 178 and second nose housing end 164. The hammer 154 is assembled into the nose housing 146 through the first nose housing end 162, with the hammer lugs 232 aligned with the impact sections 234 of the anvil 156. The gear carrier 150 is also assembled into the nose housing 146 through the first nose housing end 162, with the second gear carrier end 184 extending through the hammer 154 and received in the anvil 156. It will be appreciated that the bias member 202 is disposed around the gear carrier 150, the balls 198 are respectively disposed in the gear carrier ball grooves 196 and the hammer ball grooves 228, and the planet gears 194 are operably coupled to the gear carrier 150. The ring gear bearing 216 is disposed in the ring gear bearing recess 210 and interference or press-fit with the inner bearing surface 212 of the ring gear 152. The ring gear 152 and ring gear bearing 216 are assembled to the gear carrier 150 and nose housing 146. The ring gear 152 and ring gear bearing 216 are disposed on the gear carrier 150 with the ring gear bearing 216 disposed on and clearance-fit with the outer bearing surface 188 of the gear carrier 150. The ring gear 152 is assembled to the nose housing 146, with the second ring gear end 206 disposed in the first nose housing end 162 and abutting the stop or ledge 174, and the exterior surface of the ring gear 222 abutting the inner engagement surface 172 of the nose housing 146 and the anti-rotation tabs or protrusions 220 respectively aligned with and disposed in the anti-rotation grooves 176. The output nose mechanism 110 is also operably coupled to the motor 108 via the front motor bearing 180. As described above, the first gear carrier end 182 is disposed over the front motor bearing 180, with the front motor bearing 180 being disposed in the front motor bearing recess 190 and the outer diameter of the front motor bearing 180 clearance-fit against the inner bearing surface 192 of the gear carrier 150. This assembly of the components of the output nose mechanism 110 and the output nose mechanism 110 with the motor 108 axially aligns the ring gear 152, gear carrier 150, hammer 154, and anvil 156 with the motor shaft 128 and output axis of the motor 108.

During use of the tool 100 (i.e., when the trigger 112 is actuated by a user), the motor 108 rotates the motor shaft 128, which rotates the gear carrier 150, and the hammer 154 (via engagement of the gear carrier ball grooves 196 and hammer ball grooves 228 with respective balls 198) in either one of clockwise or counter-clockwise rotational directions, which causes the hammer lugs 232 to contact the impact sections 234 to rotate the anvil 156 and the output drive lug 166 in the desired clockwise or counter-clockwise rotational direction. Once an amount of torque required to rotate or drive the output drive lug 166 exceeds a minimum torque amount, the gear carrier 150 rotates at a faster rotational velocity than the hammer 154 and the anvil 156, thereby causing the balls 198 to traverse along the gear carrier ball grooves 196. As the balls 198 traverse the gear carrier ball grooves 196, the hammer 154 overcomes the bias force applied by the biasing member 202 and moves in an axial direction towards the motor 108 and away from the anvil 156 until the hammer lugs 232 no longer contact the impact sections 234. Once the hammer lugs 232 no longer contact the impact sections 234, the bias member 202 causes the hammer 154 to move axially towards the anvil 156 and deliver a sudden rotational impact force to the anvil 156 and, consequently, the output drive lug 166.

Figure 13:
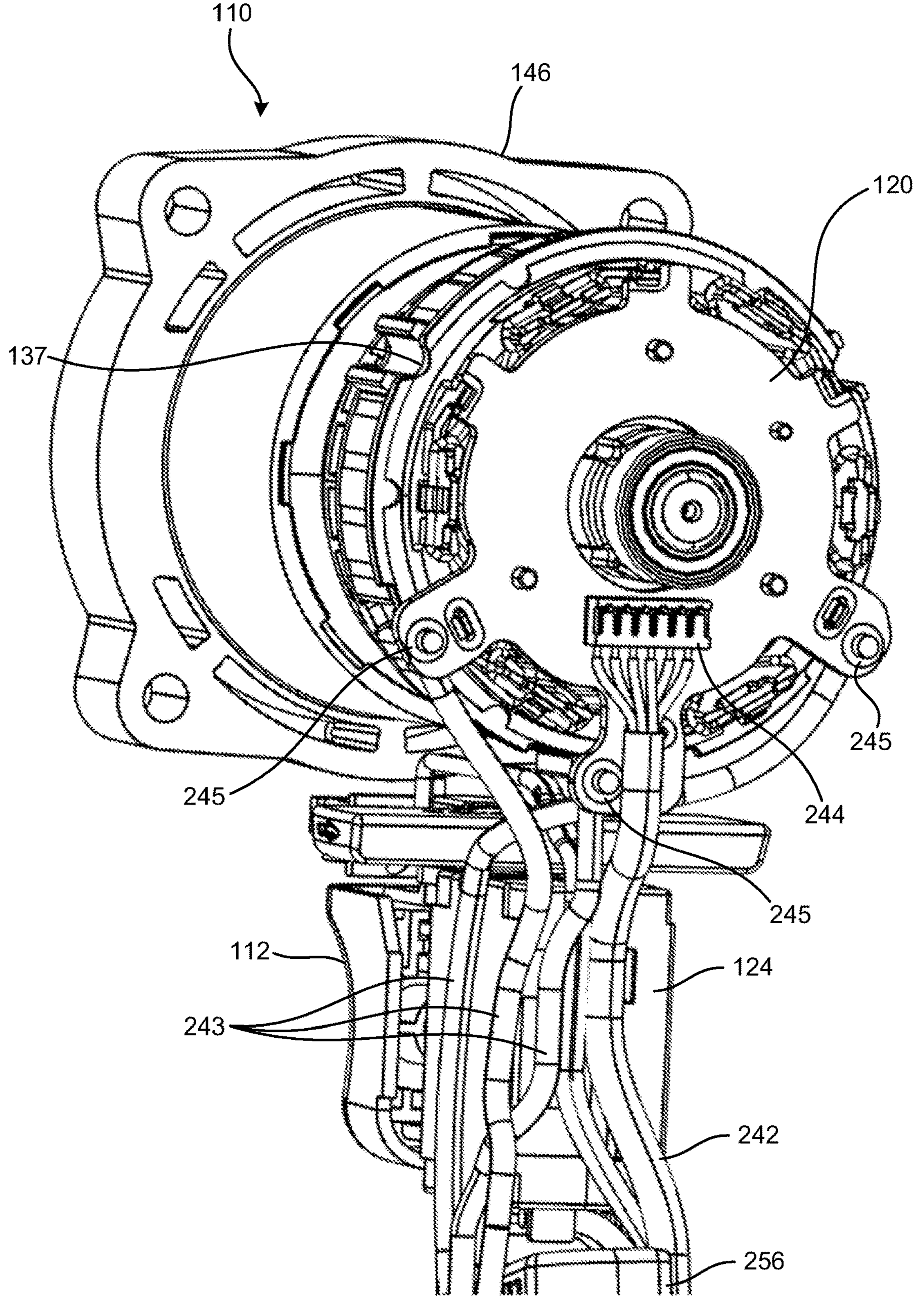
FIG. 13 is an exploded rear perspective view of a motor and output nose mechanism of the exemplar tool of FIG. 1, according to an embodiment of the present invention.

Referring to FIGS. 2, 3, and 13, the tool 100 may also include additional components. For example, and without limitation, the tool 100 may include electronic components, such as the motor control electronics 120, controller 122, and switching mechanism 124 that are operably coupled to and adapted to control the motor 108. For example, the motor control electronics 120 may include a printed circuit board (PCB) including one or more switching elements disposed thereon. The switching elements may be field effect transistors (FETs), such as, for example, metal-oxide semiconductor field-effect transistors (MOSFETs). In an embodiment, the switching elements may include three high-side switching elements, H1, H2, and H3, and three low-side switching elements, L1, L2, and L3, each being operable in either one of a first or conducting state and a second or non-conducting state. The switching elements are controlled by the PCB to selectively apply power from a power source (e.g., a battery pack) to the motor 108 to achieve desired commutation. By selectively activating particular high-side and low-side switching elements, the motor 108 is operated by having the motor control electronics 120 or controller 122 send a current signal through coils located on a stationary part of the motor 108 called a stator. The coils cause a magnetic force to be applied to a rotating part of the motor 108, called a rotor, when current runs through the coils. The rotor contains permanent magnets that interact with the magnetic forces caused by the windings of the stator. By selectively activating successive combinations of high and low-side switching elements in a particular order, thereby sending a particular order of current signals through the windings of the stator, the stator creates a rotating magnetic field which interacts with the rotor causing it to rotate, which rotates the motor shaft 128, in a well-known manner.

A rear portion of the motor shaft 128 may extend through the motor control electronics 120, and the motor control electronics 120 may be held in place in the tool housing 102 proximal to the rear end of the motor 108 by one or more grooves formed on an internal surface of the tool housing 102. The motor control electronics 120 may be coupled to the controller 122 via wiring 242 and 243. The wiring 242 may include hall sensor wires respectively coupled to low-profile wire terminals 244 of the motor control electronics 120 and wire terminals 241 (shown in FIG. 3) of the controller 122, and the wiring 243 may include phase wires respectively coupled to connections 245 of the motor control electronics 120. The wiring 242 may extend in a wire groove 246 (shown in FIG. 2) formed by the first and second housing portions 104, 106 to the controller 122. Similarly, the wiring 243 may extend in a wire groove 247 (shown in FIG. 2) formed by the first and second housing portions 104, 106 to the controller 122. The wire terminals 241 and connections 245 allow for independent replacement of the motor 108 along with the motor control electronics 120, and/or the controller 122.

The controller 122 may be disposed in the handle housing portion 116 and operably coupled to the motor control electronics 120 via wires 242 and 243. The controller 122 is also operably coupled to the switch mechanism 124 via wires 248, and power receiving terminals 250 in the power source receiving end 118 via wires 252. The controller 122 may also be part of an electronics module 254 having an electronic housing 256. For example, the electronics module 254 can include electrical components, for example, the controller 122, which may include a printed circuit board (PCB) that operably couples a battery (power source) to the trigger 112 and switch mechanism 124. The controller 122 can be enclosed within the electronics housing 256. The electronics housing 256 can be made of a reinforcing material such as metal or a high density polymer, and can further be shaped to substantially contour to the internal geometry of the handle housing portion 116. For example, the handle housing portion 116 can have an internal geometry, the electronics housing 256 can have an external geometry, and the external geometry of the electronics housing 256 can generally matingly conform to the internal geometry of the handle housing portion 116.

The switch mechanism 124 may be disposed in the motor housing portion 114 or handle housing portion 116, and is operably coupled to the power source (such as a battery) and the motor 108 via the controller 122 and motor control electronics 120. In an embodiment, the trigger 112 is disposed substantially at an intersection of the handle and motor housing portions 114 and 116, and is operably coupled to the switch mechanism 124. Actuation of the trigger 112 (such as depression of the trigger 112) causes the motor 108 to operate and rotate the motor shaft 128 in either one of clockwise and counter-clockwise rotational directions, in a well-known manner. In an embodiment, the trigger 112 may also be biased such that the trigger 112 is depressible inwardly, relative to the tool 100, to cause the tool 100 to operate, and a release of the trigger 112 causes the trigger 112 to move outwardly, relative to the tool 100, to cease operation of the tool 100 via the biased nature of the trigger 112.

The trigger 112 and switch mechanism 124 may also be a variable speed type mechanism. In this regard, actuation or depression of the trigger 112 can cause the motor 108 to rotate the motor shaft 128 at a faster speed the further the trigger 112 is depressed. A direction selector 258 may also be disposed near an intersection of the motor and handle housing portions 114, 116. The direction selector 258 is adapted to be moved between first and second positions (for example, by a user) to allow the user to select the desired rotational direction of the motor 108. For example, movement of the direction selector 258 to the first position can cause selection of the clockwise rotational direction, and movement of the direction selector 258 to the second position can cause selection of the counter-clockwise rotational direction.

While the tool 100 is described above as having an output drive lug 166, the tool 100 may have different types of output mechanisms. For example, the tool 100 may include a drill chuck, a hammer type output with a drill chuck or a drive lug, an impact type mechanism with a drill chuck or a drive lug, etc. The drive lug or drill chuck or can be coupled to other devices, such as a socket or other adapter, to apply torque to a work piece, such as, for example, a screw or bolt, in a well-known manner.

While, the tool 100 is described as powered by a battery, the tool 100 may be power by other electrical power sources, such as an external wall outlet, etc.

As discussed herein, the tool 100 is a pistol grip type power tool, such as an impact wrench. However, the tool 100 can be any electrically powered or hand-held impact tool, including, without limitation, a hammer drill, impact drill, impact ratchet wrench, or other powered impact tool, that is powered by electricity via a power source (such as a wall outlet and/or generator outlet) or a battery.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. An impact tool including a motor with a motor shaft, the impact tool comprising:

a tool housing, wherein the motor is disposed in the tool housing;

a nose housing coupled to the tool housing;

a front motor bearing disposed on a front portion of the motor shaft;

a gear carrier extending into the nose housing and having a front motor bearing recess that receives the front motor bearing, and a gear carrier outer bearing surface;

a ring gear bearing disposed on the gear carrier outer bearing surface; and a ring gear having opposing first and second ring gear ends, a ring gear bearing recess disposed proximal to the first ring gear end and that is adapted to receive the ring gear bearing, wherein the second ring gear end is disposed in and supported by the nose housing, and the front motor bearing and the ring gear bearing radially overlap.

2. The impact tool of claim 1, wherein the gear carrier includes a gear carrier inner bearing surface that surrounds the front motor bearing recess, and an outer diameter of the front motor bearing is engaged with the gear carrier inner bearing surface.

3. The impact tool of claim 1, wherein the ring gear includes a ring gear inner bearing surface that surrounds the ring gear bearing recess, an outer diameter of the ring gear bearing is engaged with the ring gear inner bearing surface, and an inner diameter of the ring gear bearing is engaged with the gear carrier outer bearing surface.

4. The impact tool of claim 1, wherein the gear carrier includes opposing first and second gear carrier ends, the front motor bearing recess is formed in the first gear carrier end and the second gear carrier end is disposed in the nose housing.

5. The impact tool of claim 1, wherein the ring gear bearing recess is formed in an inner surface of the ring gear proximal to the first ring gear end.

6. The impact tool of claim 5, wherein the ring gear includes a protrusion on an exterior surface of the ring gear proximal to the second ring gear end, and the nose housing includes a groove disposed in an internal surface of the nose housing that is adapted to matingly engage the protrusion.

7. The impact tool of claim 1, wherein the tool housing includes an inner surface with an inwardly protruding motor rib that abuts and supports an exterior surface of the motor.

8. The impact tool of claim 1, further comprising a rear motor bearing disposed on a rear portion of the motor shaft, wherein the tool housing includes an inner surface with a rear motor bearing pocket, the rear motor bearing is disposed in the rear motor bearing pocket.

9. The impact tool of claim 1, further comprising motor control electronics coupled to a rear of the motor.

10. An impact tool, comprising:

a tool housing including an inner surface with a rear motor bearing pocket formed in the inner surface;

a motor disposed in the tool housing and including a motor shaft with front and rear portions;

a front motor bearing disposed on the front portion;

a rear motor bearing disposed on the rear portion, wherein the rear motor bearing is disposed in the rear motor bearing pocket;

a nose housing coupled to the tool housing, wherein the inner surface of the tool housing includes an inwardly protruding nose housing rib that abuts and supports an exterior surface of the nose housing; and a gear carrier extending into the nose housing and including a bearing recess that receives the front motor bearing.

11. The impact tool of claim 10, further comprising motor control electronics coupled to a rear of the motor.

12. The impact tool of claim 10, wherein the inner surface of the tool housing includes an inwardly protruding rib that abuts and supports an exterior surface of the motor.

13. The impact tool of claim 10, wherein the motor is a frameless motor.

14. The impact tool of claim 10, wherein the tool housing includes first and second housing portions that are coupled together to cooperatively form the tool housing.

15. The impact tool of claim 10, further comprising a ring gear having opposing first and second ring gear ends, wherein the first ring gear end supports an exterior of the gear carrier, and the second ring gear end is disposed in and supported by the nose housing.

16. The impact tool of claim 15, further comprising a nose bushing coupled to the nose housing.

17. The impact tool of claim 16, wherein the nose bushing includes internal seal and grease grooves.

18. An impact tool, comprising:

a tool housing including an inner surface with a rear motor bearing pocket formed in the inner surface, an inwardly protruding motor rib, a recess, and an inwardly protruding nose housing rib;

a motor disposed in the tool housing and including a motor shaft and a stator having an exterior stator surface and a flange portion, wherein the motor rib abuts the exterior stator surface and the flange portion is disposed in the recess;

a rear motor bearing disposed on the motor shaft and in the rear motor bearing pocket, wherein the rear motor bearing pocket and the motor rib cooperatively align the motor in the tool housing; and a nose housing coupled to the tool housing and including a nose housing exterior surface, wherein the nose housing rib abuts the nose housing exterior surface and aligns the nose housing with the motor.

19. The impact tool of claim 18, wherein the motor rib restricts radial movement of the motor with respect to the tool housing.

20. The impact tool of claim 18, wherein the flange portion of the stator being disposed in the recess restricts axial movement of the motor with respect to the tool housing.

21. The impact tool of claim 20, wherein the opposing side surfaces restrict axial movement of the motor with respect to the tool housing.

22. The impact tool of claim 18, wherein the tool housing includes first and second housing portions that are coupled together to cooperatively form the tool housing.

23. The impact tool of claim 18, wherein the inner surface of the tool housing further includes an anti-rotation rib that restricts rotational movement of the stator with respect to the tool housing.

* * * * *